United States Patent Office 3,708,537
Patented Jan. 2, 1973

---

3,708,537
CERTAIN PERFLUOROALKYL SULFONAMIDES
James D. Groves, Hudson Township, St. Croix, Wis., assignor to Minnesota Mining and Manufacturing Company, St. Paul, Minn.
No Drawing. Continuation of application Ser. No. 555,979, June 8, 1966. This application July 2, 1969, Ser. No. 845,617
Int. Cl. C07c *143/72, 143/84*
U.S. Cl. 260—556 F    3 Claims

ABSTRACT OF THE DISCLOSURE

A fluorocarbon amide having a hydrogen atom bonded to the amide nitrogen (a primary or secondary amide) is added across the vinyl group of a vinyl sulfone so that the hydrogen becomes bonded to one vinyl carbon atom, the remainder of the fluorocarbon amide becomes bonded to the other vinyl carbon atom and the resulting adduct is recovered. The adducts formed by this reaction vary from liquids to solids to polymers and find varied uses, e.g. as dielectric fluids, heat transfer media, lubricants, release coatings, barrier laminants and oil- and water-repellent coatings.

---

This is a continuation of application Ser. No. 555,979 filed June 8, 1966 and now abandoned.

DETAILED DESCRIPTION

The present invention relates to a process of reacting fluorocarbon amides with vinyl sulfones, and to adducts obtained thereby.

It is an object of this invention to provide a novel method for the production of fluorocarbon group containing adducts.

It is another object of the invention to provide a method for the production of certain new fluorocarbon group-containing polymers.

It is another object of the invention to provide a novel class of fluorocarbon group-containing adducts.

It is still another object of the invention to provide certain novel oil- and water-repellent treating agents for substrates.

It is still another object of the invention to provide novel lubricants and lubricant additives.

It is a further object of the invention to provide a new class of reactive chemical compounds.

It is a still further object of the invention to provide durably oil- and water-repellent articles.

It is still another object of the invention to provide durably oil- and water-repellent fibers.

Various other objects of the invention will become apparent to those skilled in the art upon reading the following description and disclosure.

The process of the invention relates to the addition of a fluorocarbon amide to a vinyl sulfone and the recovery of the resulting adduct. Thus, according to the invention a fluorocarbon amide having a hydrogen atom bonded to the amide nitrogen (a primary or secondary amide) is added across the vinyl group of a vinyl sulfone so that the hydrogen atom becomes bonded to one vinyl carbon atom, the remainder of the fluorocarbon amide becomes bonded to the other vinyl carbon atom and the double bond of the vinyl group becomes a single (carbon-carbon) bond and the resulting adduct is recovered.

Ordinarily, but not invariably, the addition occurs in such a way that the amide hydrogen atom adds to the ethylenic carbon atom which is α to the sulfone group of the vinyl sulfone and the remainder of the fluorocarbon amide adds to the ethylenic carbon atom which is β to the sulfone group thereof. For convenience, the addition will be referred to herein as occurring in this manner, although it is understood that the reverse addition is also contemplated (i.e. in which the hydrogen atom adds to the ethylenic carbon atom which is β to the sulfone group and the remainder of the fluorocarbon amide adds to the ethylenic carbon atom which is α to the sulfone. As will also be seen hereinafter, the precursors can be chosen so that a single compound can enter into a plurality of unit reactions of the type just described.

The fluorocarbon amides which are useful in the process of the invention include both monoamides and diamides and the individual functions can be either sulfoamides or carbonamides. In addition, the functions can be either primary amides (in which two hydrogen atoms are bonded to the amide nitrogen) or secondary amides (in which one hydrogen atom is bonded to the amide nitrogen). Among these compounds are the following:

$CF_3SO_2N(CH_3)H$
$C_8F_{17}SO_2NH_2$
$C_{14}F_{29}CON(C_3H_7)H$
$C_{24}F_{49}CON(CH_3)H$
$C_6F_{11}C_2F_4CONH_2$
$[H(C_2H_5)NOCC_2F_4]_2O$
$H_2NSO_2C_2F_4N(C_2F_4)_2NC_2F_4SO_2NH_2$

These compounds ordinarily contain between 1 and about 50 carbon atoms, normally not more than about 30 carbon atoms.

The fluorocarbon groups of the fluorocarbon amides can be a perfluoroalkyl group having an open (acyclic) straight- or branched-chain, or a cyclic structure (e.g. a perfluorocyclohexyl group having a 6-membered ring structure) or it can consist of a combination of perfluoroalkyl straight chain and perfluorocyclic groups. The fluorocarbon group may be bonded to the remainder of the molecule through either a cyclic or an acyclic carbon atom (that is, this carbon atom may or may not be in a ring) and two carbon atoms of the fluorocarbon group may be linked together by an oxygen atom or three carbons may be linked together by a nitrogen atom, since oxygen and nitrogen provide very stable linkages between fluorocarbon groups and do not interfere with the highly stable and inert character of the complete fluorocarbon group or structure. A minor percentage of the fluorine atoms in the fluorocarbon groups (preferably not more than about 20 percent thereof) can also be replaced by such other atoms as hydrogen, chlorine, bromine, etc.

The vinyl sulfone precursors of the present invention include both monovinyl sulfones and divinyl sulfone. The preferred vinyl sulfones have the formula $ASO_2CH=CH_2$, wherein A is an organic group containing between 1 and about 20 carbon atoms (i.e. the vinyl sulfone compound preferably contains not more than about 22 carbon atoms). Particularly suitable monovinyl sulfones are those in which A is an alkyl, aryl or aralkyl group, e.g.:

and

The fluorocarbon amide precursors can be mono-, di- or poly-functional with respect to the unit reaction with vinyl sulfone groups, the functionality depending upon the number of hydrogen atoms bonded to amide nitrogen atoms therein. Thus, for example, a mono-secondary amide is mono-functional, a mono-primary amide or a di-secondary amide is difunctional, a diamide having one primary amide function and one secondary amide function is trifunctional, a di-primary amide is tetrafunctional, etc. The mono-vinyl sulfone reactants are mono-functional and divinyl sulfone is difunctional with respect to the unit reaction.

Any of the foregoing types of fluorocarbon amides can be reacted with any of the types of vinyl sulfones to form the adducts of the invention and, depending upon the stoichiometry of the two reactants in the reaction mixture, one or more or all of the functions of any reactant can be utilized. Thus, if equimolar amounts of a mono-secondary fluorocarbon amide and a monovinyl sulfone are reacted, a 1:1 adduct is formed which contains no reactive amide hydrogen or vinyl sulfone. If equimolar amounts of a mono-secondary fluorocarbon amide and divinyl sulfone are reacted, the resulting 1:1 adduct has a single reactive vinyl sulfone group, etc. Further, it will be seen that linear and crosslinked polymers and compounds comprising varying ratios of fluorocarbon amides to vinyl sulfone derived units are included among the adducts of the invention.

A preferred class of the adducts of the invention are compounds which have the formula $$R_fQN(R)CH_2CH_2SO_2A$$

wherein $R_f$ is a fluorocarbon group of not more than about 25 carbon atoms, Q is —CO— or —SO$_2$—, R is hydrogen, an alkyl group containing up to about six carbon atoms or —CH$_2$CH$_2$SO$_2$A and A is an organic group containing not more than about 20 carbon atoms. Particularly preferred among these compounds are those in which $R_f$ is a perfluoroalkyl group containing from about 3 to 18 carbon atoms.

The process of the invention is normally carried out in the presence of a highly basic catalyst such, for example, as a tertiary aliphatic amine and/or a heterocyclic amine, e.g. triethylamine or pyridine. Aqueous solutions of inorganic bases or their highly basic salts can also be used, e.g. approximately 50% aqueous solutions of sodium hydroxide and potassium hydroxide. An inert solvent, particularly one which will dissolve the fluorocarbon amide at the temperature of reaction, can also be added to the reaction mixture if desired. Among the solvents which are useful are lower aliphatic ethers, such as diethyl ether and the dimethyl ether of tetraethylene glycol and aromatic hydrocarbons, such as benzene, toluene and xylene.

The reaction is normally run at a temperature above about 50° C. and is preferably in the range of from about 80 to 150° C. or at the reflux temperature of the mixture. It is sometimes advantageous to carry out the reaction in a pressure vessel in order to raise the reaction temperature still higher without danger of losing all or a part of reaction mixture, particularly when especially volatile solvents or reactants are used. At the end of the reaction, the desired adduct can be removed by various known techniques, such as crystallization, distillation (especially vacuum distillation) etc. The catalysts are often neutralized with a strong inorganic acid at the end of the reaction. They are generally water soluble and can be easily removed from the remainder of the reaction mixture if desired.

The adducts of the invention vary from liquids to solids and polymers. Those in which reactive groups remain are valuable intermediates for further reactions, e.g. they can be further reacted to form adducts of the invention which contain no active groups. The adducts of the invention which have no reactive groups have various uses as follows: The liquids are generally useful as dielectric fluids and heat transfer media. They are also highly polar and therefore tend to adsorb on metal surfaces and function well as lubricants. The monomeric solids form release coatings, are useful as components in solid lubricant mixtures and some can be used as oil- and water-repellent coatings. The polymers provide barrier laminants and oil- and water-repellent coatings. The adducts which are used for oil- and water-repellent coatings (e.g. on fibrous and porous surfaces such as woven fabrics or cloth, random web materials including felt and paper, wood, leather, fur, asbestos, ceramics, cast polymers, etc.) are preferably those which have perfluorinated groups containing at least 3 and normally not more than about 18 fully fluorinated carbon atoms, such as perfluoroalkyl groups. Adducts to be used in lubrication applications need contain only trifluoromethyl groups, although larger fluorochemical groups are preferred.

The following examples are offered to furnish a better understanding of the present invention and are not to be construed as in any way limiting thereof. All percentages are by weight unless otherwise specified.

EXAMPLE 1

$$C_8F_{17}SO_2N(C_2H_5)CH_2CH_2SO_2CH=CH_2$$

About 26.3 g. (0.05 m.) of $C_8F_{17}SO_2N(C_2H_5)H$, 22.6 g. (0.20 m.) of divinyl sulfone, 2.5 g. of triethylamine and 100 ml. of ether were refluxed for 15 hours. The ether was removed under vacuum leaving a semi-solid residue. After washing twice with toluene to remove unreacted divinyl sulfone, there remained 22.0 g. (69%) of a white solid, M.P. 120–125° C. One recrystallization from absolute methanol gave 19.6 g. of white crystals, M.P. 123–125° C.

*Analysis.*—Calc'd for $C_{14}F_1F_{17}S_2O_4N$ (percent): C, 26.2; F, 50.05; S, 10.0. Found (percent): C, 26.0; F, 46.0; S, 10.3.

EXAMPLE 2

$$C_8F_{17}SO_2N\begin{array}{c}CH_2-CH_2\\ \diagup \qquad \diagdown \\ \diagdown \qquad \diagup \\ CH_2-CH_2\end{array}SO_2$$

About 5 g. of $C_8F_{17}SO_2NH_2$, 5.65 g. of divinyl sulfone, 1 g. of triethylamine and 50 ml. of diethyl ether were refluxed together for 15 hours. The resulting white precipitate was filtered free from the reaction mixture, washed with toluene and recrystallized from acetonitrile to give 4.7 g. of a product melting at 180–200° C. with decomposition.

The infrared spectrum of this material showed no absorption in either the 6μ region (characteristic of C=C) or the 3μ region (characteristic of N—H) thus indicating the absence of both a carbon-carbon double bond and an amido hydrogen atom, and confirming the above structure.

I claim:
1. A compound of the formula

$$R_fSO_2N(R)CH_2CH_2SO_2CH=CH_2$$

wherein $R_f$ is a perfluoroalkyl group containing not more than 25 carbon atoms and R is an alkyl group containing up to six carbon atoms.

2. A compound according to claim 1 wherein $R_f$ is a perfluoroalkyl group containing from 3 to 18 carbon atoms.

3. The compound of the formula $$C_8F_{17}SO_2N(C_2H_5)CH_2CH_2SO_2CH=CH_2$$

References Cited

FOREIGN PATENTS

| 1,188,083 | 3/1965 | Germany | 260—243 B |
| 1,194,404 | 6/1965 | Germany | 260—556 F |

ALEX MAZEL, Primary Examiner

R. J. GALLAGHER, Assistant Examiner

U.S. Cl. X.R.

260—243 R, 561 HL, 607 A; 252—8.75, 63.7, 67, 78